(12) United States Patent
Martin et al.

(10) Patent No.: US 11,196,210 B2
(45) Date of Patent: Dec. 7, 2021

(54) CIRCULAR CONNECTOR WITH INTEGRAL COUPLING RING

(71) Applicant: TE CONNECTIVITY SERVICES GMBH, Schaffhausen (CH)

(72) Inventors: Andrew Martin, Glendale, CA (US); Hailing Liu, Union City, CA (US); Xiaoming Luo, Hummelstown, PA (US); Thierry Emile Marin-Martinod, Hershey, PA (US); Matt McAlonis, Elizabethtown, PA (US); Mark Stephen Ostasiuk, Newark, CA (US); Kevin Michael Thackston, York, PA (US)

(73) Assignee: TE CONNECTIVITY SERVICES GmbH, Schaffhausen (CH)

( * ) Notice: Subject to any disclaimer, the term of this patent is extended or adjusted under 35 U.S.C. 154(b) by 0 days.

(21) Appl. No.: 16/792,436

(22) Filed: Feb. 17, 2020

(65) Prior Publication Data
US 2021/0257770 A1     Aug. 19, 2021

(51) Int. Cl.
*H01R 13/50*       (2006.01)
*H01R 13/641*      (2006.01)
(Continued)

(52) U.S. Cl.
CPC ........... *H01R 13/50* (2013.01); *H01R 13/623* (2013.01); *H01R 13/6278* (2013.01); *H01R 13/641* (2013.01); *H01R 43/18* (2013.01)

(58) Field of Classification Search
CPC .. H01R 13/50; H01R 13/623; H01R 13/6278; H01R 13/641; H01R 43/18
See application file for complete search history.

(56) References Cited

U.S. PATENT DOCUMENTS

| | | | | |
|---|---|---|---|---|
| 2,984,811 A | * | 5/1961 | Hennessey, Jr. ...... | H01R 13/623 439/153 |
| 3,901,574 A | * | 8/1975 | Paullus ................ | H01R 13/623 439/315 |

(Continued)

FOREIGN PATENT DOCUMENTS

WO     2013/135848 A1     9/2013

OTHER PUBLICATIONS

Vermeir, et al, "Removing Raw Material When Designing for Additive Manufacturing", https://sirris.be.removing-raw-material-when-designing-additive-manufacturing, Sep. 3, 2019, pp. 1-10.

(Continued)

*Primary Examiner* — Tho D Ta

(57) ABSTRACT

An electrical connector includes a shell and a coupling ring. The shell has contact receiving passages and an outer wall with a coupling ring retaining projection. The coupling ring is integrally mounted on the shell. The coupling ring is movable between a first position and a second position. A spring is integrally positioned on the coupling ring. The spring is provided in a stressed position when the coupling ring is moved to the second position. Openings are provided in the coupling ring; the openings being positioned proximate the spring. The opening are dimensioned to allow the removal of residual material produced during the manufacture of the electrical connector.

15 Claims, 6 Drawing Sheets

(51) Int. Cl.
    *H01R 13/627*     (2006.01)
    *H01R 13/623*     (2006.01)
    *H01R 43/18*     (2006.01)

(56) References Cited

U.S. PATENT DOCUMENTS

| | | | |
|---|---|---|---|
| 4,168,105 A * | 9/1979 | Herrmann, Jr. | H01R 13/623 |
| | | | 439/319 |
| 4,664,460 A | 5/1987 | Vandame | |
| 6,203,349 B1 * | 3/2001 | Nakazawa | H01R 13/623 |
| | | | 439/314 |
| 9,793,639 B1 | 10/2017 | Morello et al. | |
| 10,396,485 B1 | 8/2019 | Smoll et al. | |
| 10,651,593 B2 * | 5/2020 | Wu | H01R 13/6277 |
| 2013/0203280 A1 * | 8/2013 | Greub | H01R 13/625 |
| | | | 439/350 |

OTHER PUBLICATIONS

European Search Report, dated Jun. 21, 2021, EP 21 15 7200, European Application No. 21157200.3-1201.
European Search Report, dated Jul. 1, 2021, EP 21 15 7169, European Application No. 21157169.0-1201.

* cited by examiner

CIRCULAR CONNECTOR WITH INTEGRAL COUPLING RING

FIELD OF THE INVENTION

The present invention is directed a circular connector with an integral coupling ring. In particular, the invention is directed to a circular connector which is manufactured from an additive manufacturing process and which has a coupling ring integrally molded thereon.

BACKGROUND OF THE INVENTION

Circular connectors manufactured using traditional manufacturing processes include many different individual components which must be manufactured and assembled. The various components, including the housing, the coupling ring, and the spring arms must be separately molded or formed and then assembled to complete the circular connector assembly. This is an expensive and time consuming process, as various molds and tooling is required for the manufacture and assembly.

Alternatively, various connectors can be manufactured using 3D printing or other additive manufacturing process. While this type of process is advantageous for certain connectors, 3D printing or other additive manufacturing processes are not effective for connectors in which product features do not allow for adequate residual resin or powder to be cleaned out.

It would, therefore, be beneficial to provide a circular connector with required product features, such as an integral coupling ring and integral spring clips which can be manufactured using 3D printing or other additive manufacturing processes while allowing for the residual resin to be completely removed from the connector.

SUMMARY OF THE INVENTION

An embodiment is directed to an electrical connector which includes a shell and a coupling ring. The shell has contact receiving passages and an outer wall with a coupling ring retaining projection. The coupling ring is integrally mounted on the shell. The coupling ring is movable between a first position and a second position. A spring is integrally positioned on the coupling ring. The spring is provided in a stressed position when the coupling ring is moved to the second position. Openings are provided in the coupling ring, the openings being positioned proximate the spring. The openings are dimensioned to allow the removal of residual material produced during the manufacture of the electrical connector.

An embodiment is directed to an electrical connector made from an additive manufacturing process. The electrical connector includes a shell and a coupling ring. The shell has contact receiving passages and an outer wall with a coupling ring retaining projection. The coupling ring is integrally mounted on the shell and is movable between a first position and a second position. A spring is integrally positioned on the coupling ring. The spring is provided in a stressed position when the coupling ring is moved to the second position. Openings are provided in the coupling ring. The openings are positioned proximate the spring and are dimensioned to allow the removal of residual material produced during the additive manufacturing process. A gap is provided between the shell and the coupling ring. As the coupling ring and the shell are formed in the same additive manufacturing process, the gap between the coupling ring and the shell facilitates the cleaning or removal of the excess material and allows the coupling ring to rotate about the shell.

An embodiment is directed to a method of manufacturing an electrical connector with an integral coupling ring. The method includes: printing a body of the circular electrical connection in an additive manufacturing process; printing the integral coupling ring simultaneously with the printing of the body, the integral coupling ring being spaced from the body to allow the integral coupling ring to rotate relative to the body; and removing residual residue produced during the printing and cleaning of the body and the integral coupling ring through openings formed during the printing of the body and the integral coupling ring.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
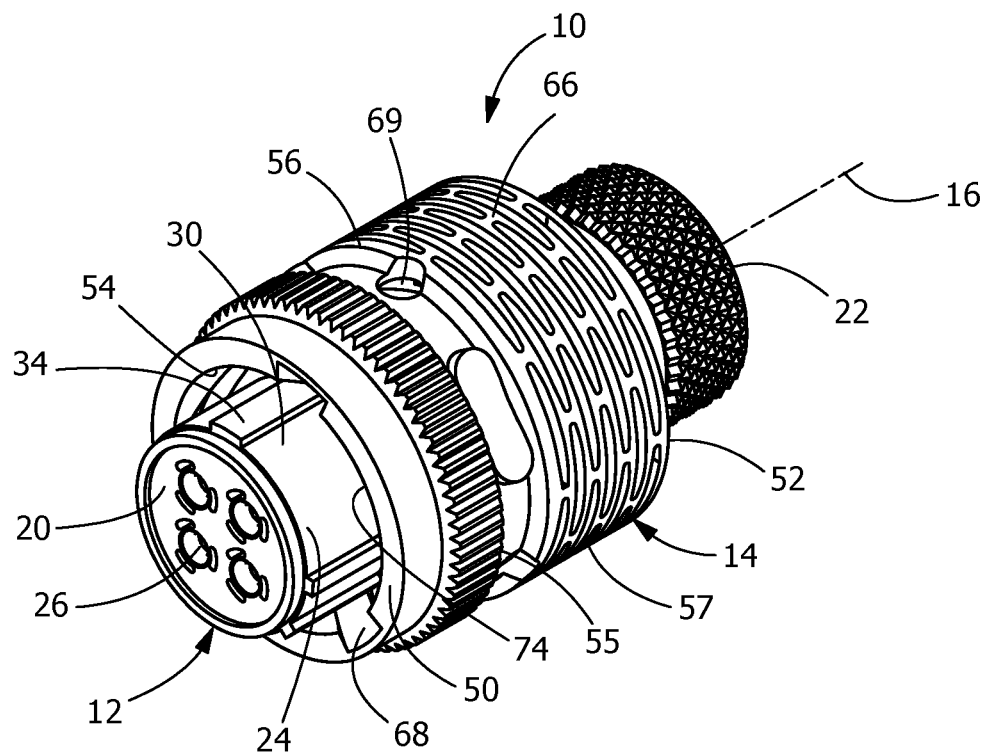
FIG. 1 is a front perspective of an illustrative embodiment of a circular electrical connector of the present invention.
Figure 2:
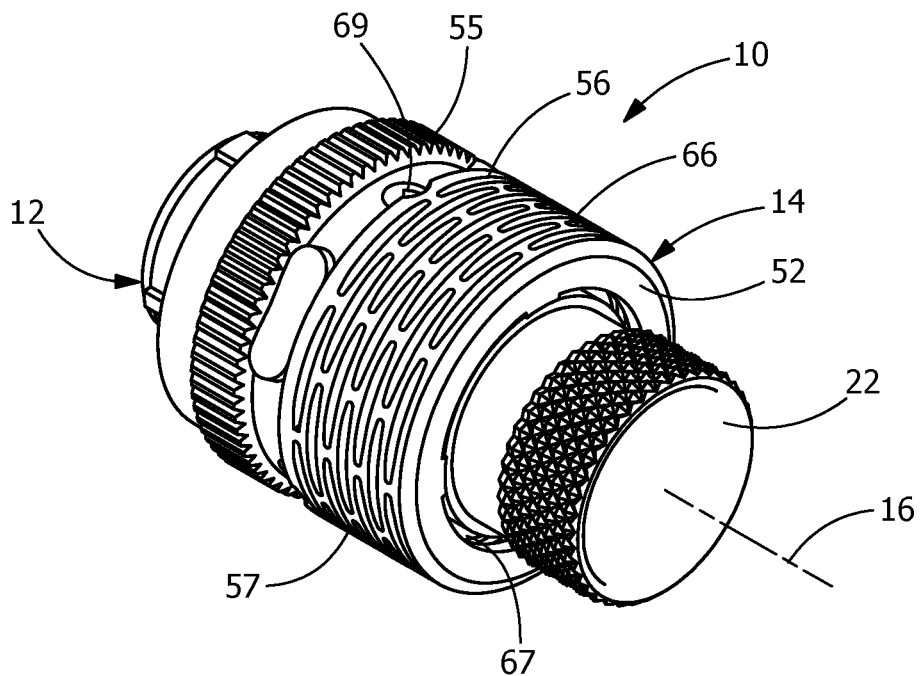
FIG. 2 is a back perspective view of the circular connector of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

With reference to the embodiment shown in FIGS. 1 through 6, a circular electrical connector plug assembly is shown generally at 10. The assembly of this invention comprises an electrical connector shell 12 and a coupling ring 14. The shell 12 and the coupling ring 14 are integrally molded in a 3D printing process or other additive manufacturing processes. While the coupling ring 14 is rotatably mounted on the shell 12, the coupling ring 14 is not removable from the shell 12. The shell 12 and coupling ring 14 define a center longitudinal axis 16 for the connector assembly.

The shell 12 includes a mating face 20 and an oppositely facing conductor receiving face 22. A circular outer wall 24 extends between the mating face 20 and the conductor receiving face 22. Contact receiving passages 26 extend through the shell 12 from the mating face 20 to the conductor receiving face 22. The contact receiving passages 26 are dimensioned to receive contacts (not shown) therein. The number and size of the contact receiving passages 26 may be varied without departing from the scope of the invention.

The outer wall 24 of the shell 12 includes a mating connector receiving portion 30 which extends circumferentially about the shell 12. The mating connector receiving portion 30 extends from the mating face 20 to a coupling ring receiving portion 32 of the outer wall 24. One or more guide or keying projections 34 project outward from the a mating connector receiving portion 30 of the outer wall 24. The keying projections 34 extend in a direction parallel to the longitudinal axis 16 of the shell 12. The size and positioning of the keying projections 34 may vary without departing from the scope of the invention.

A coupling ring retaining projection 36 extends from the coupling ring receiving portion 32 of the outer wall 24 circumferentially about the shell 12. In the illustrative embodiment shown, the coupling ring retaining projection 36 is positioned proximate to, but spaced from, the conductor receiving face 22. The coupling ring retaining projection 36 has a front shoulder 38 and a rear shoulder 40. The front shoulder 38 and the rear shoulder 40 extend in a direction which is essentially perpendicular to the longitudinal axis 16 of the shell 12.

The coupling ring 14 includes a mating face 50 and an oppositely facing rear face 52. A circular inner wall 54 and a circular outer wall 56 extends between the mating face 50 and the rear face 52. The diameter of the inner wall 54 of the coupling ring 14 is larger than the diameter of the outer wall 24 of the shell 12. The mating face 50 of the coupling ring 14 and the mating face 20 of the shell 12 are positioned in approximate alignment.

The coupling ring 14 has a mating connector receiving portion 55 and a shell receiving portion 57. A first locking projection 58 extends from the inner wall 54 of the shell receiving portion 57 in a direction away from the outer wall 56. The first locking projections 58 extends from the inner wall 54 circumferentially about the coupling ring 14. In the illustrative embodiment shown, the first locking projection 58 is positioned proximate to, but spaced from, the rear face 52. The first locking projection 58 has a first shoulder 60 which extends in a direction which is essentially perpendicular to the longitudinal axis 16 of the shell 12.

A second locking projection 62 extends from the inner wall 54 of the shell receiving portion 57 in a direction away from the outer wall 56. The second locking projection 62 extends from the inner wall 54 circumferentially about the coupling ring 14. In the illustrative embodiment shown, the second locking projection 62 is positioned closer to the mating face 50 than the first locking projection 58. The second locking projection 62 has a second shoulder 64 which extends in a direction which is essentially perpendicular to the longitudinal axis 16 of the shell 12.

A mesh spring 66 is integrally formed in the shell receiving portion 57. The mesh spring 66 extends between the first locking projection 58 and the second locking projection 62. The mesh spring 66 extends from the outer wall 56 to the inner wall 54. The mesh spring 66 is provided to allow the movement of the second locking projection 62 and the mating connector receiving portion 55 to move relative to the first locking projection 58, as will be more fully described. While a mesh spring is shown, other integrated compliant features may be used without departing from the scope of the invention.

When printed, the coupling ring 14 is spaced from the shell 12 by a gap 67. The size of the gap can be varied. As the coupling ring 14 and the shell 12 are formed in the same process, and as tooling cannot be inserted into the gap 67 to properly form the components, the coupling ring 14 and the shell 12 must be formed by an additive manufacturing process, such as, but not limited to 3D printing. Consequently, it is imperative that excess material or unwanted material be able to be cleaned out or removed from the coupling ring 14 and the shell 12 upon completion of the formation of the assembly 10. Providing a gap 67 between the coupling ring 14 and the shell 12 facilitates the cleaning or removal of the excess material. The gap 67 also allows the coupling ring to rotate about the shell 12.

Openings 69 are provided on the coupling ring 14. The openings 69 allow the camming projections 92 to be seen when the mating connector 80 is fully mated in the assembly 10, thereby providing a visual indication of proper mating.

Figure 4:
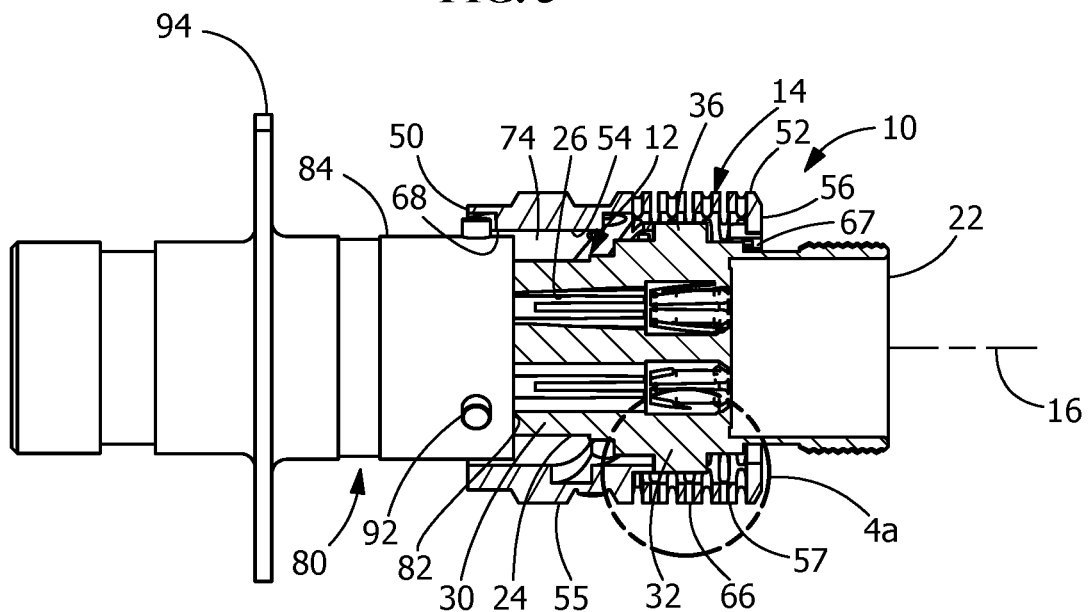
FIG. 4 is a cross-sectional view of the circular electrical connector of FIG. 1 in an initial position on the mating connector.
Figure 4A:
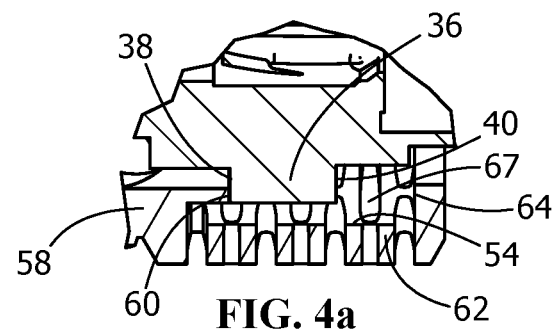
FIG. 4a is an enlarged view of the area designated by 4a of FIG. 4.

When in the initial or unstressed position, as shown in FIG. 4, the first shoulder 60 of the first locking projection 58 and the second shoulder 64 of the second locking projection 62 are able to move relative to the coupling ring retaining projection 36 of the coupling ring receiving portion 32 of the outer wall 24 circumferentially about the shell 12. In this position, the mesh spring 66 is in an unstressed position, thereby allowing the limited movement between the coupling ring 14 and the shell 12. However, while the coupling ring can move relative to the shell 12, the cooperation of the first shoulder 60 of the first locking projection 58 and the second shoulder 64 of the second locking projection 62 with the front shoulder 38 and the rear shoulder 40 of the coupling ring retaining projection 36 of the coupling ring receiving portion 32 of the outer wall 24 prevent the removal of the coupling ring 14 from the shell 12.

One or more helical annular grooves 68 are provided in the inner wall 54 of the mating connector receiving portion 55 of the coupling ring 14. The helical annular grooves 68 extend from the mating face 50 toward the rear face 52. The helical annular grooves 68 have locking recesses 70 provided proximate closed ends of the grooves 68.

A mating connector receiving recess 74 is provided between the outer wall 24 of the shell 12 and the inner wall 54 of the coupling ring 14. The mating connector receiving recess 74 extends from the mating face 20 to the coupling ring receiving portion 32 of the outer wall 24.

Figure 3:
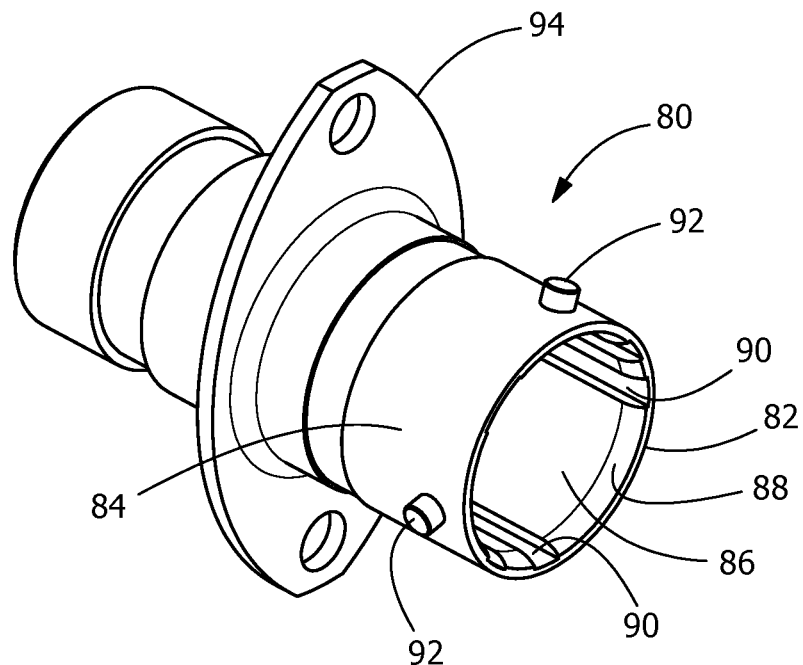
FIG. 3 is a perspective view of a mating connector which mates with the circular connector of FIG. 1.

As best shown in FIG. 3, a mating connector 80 has a mating face 82 and a wall 84 which extends therefrom. The wall 84 defines a cavity 86 which is dimensioned to receive the shell 12 of the circular electrical plug assembly 10. An inner surface 88 of the wall 84 has guiding or keying recesses 90. The keying recesses 90 extend in a direction parallel to the longitudinal axis 16 of the shell 12. The size and positioning of the keying recesses 90 may vary without departing from the scope of the invention.

One or more camming projections 92 project from the wall 84 in a direction away from the cavity 86. The camming projections 92 are dimensioned and positioned on the wall to cooperate with the helical annular grooves 68 of the coupling ring 14.

Figure 5:
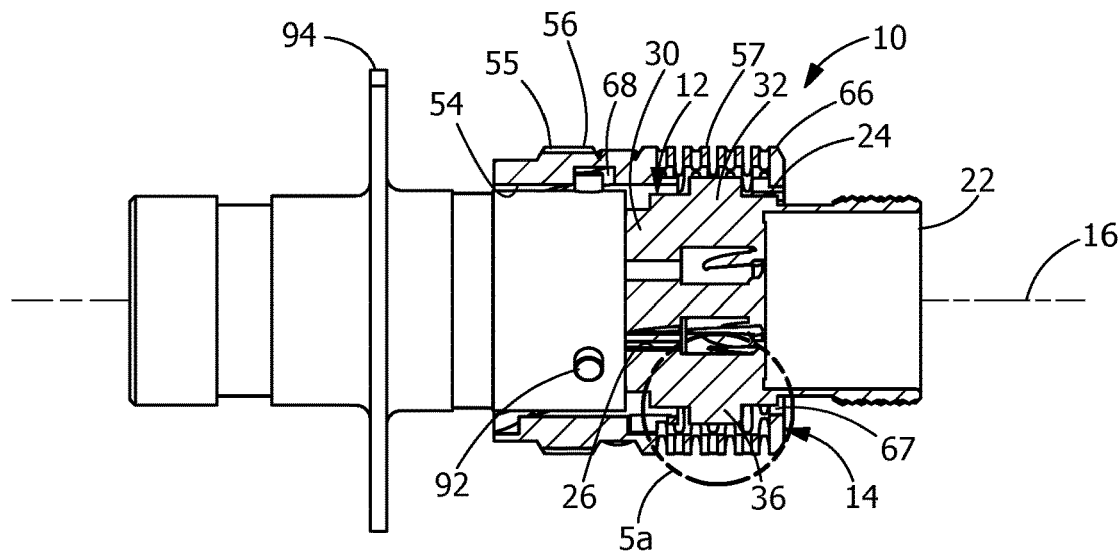
FIG. 5 is a cross-sectional view of the circular electrical connector of FIG. 1 in a partially inserted position on the mating connector.
Figure 5A:
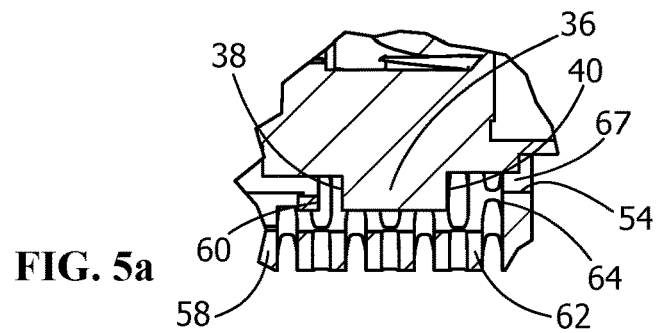
FIG. 5a is an enlarged view of the area designated by 5a of FIG. 5.
Figure 6:
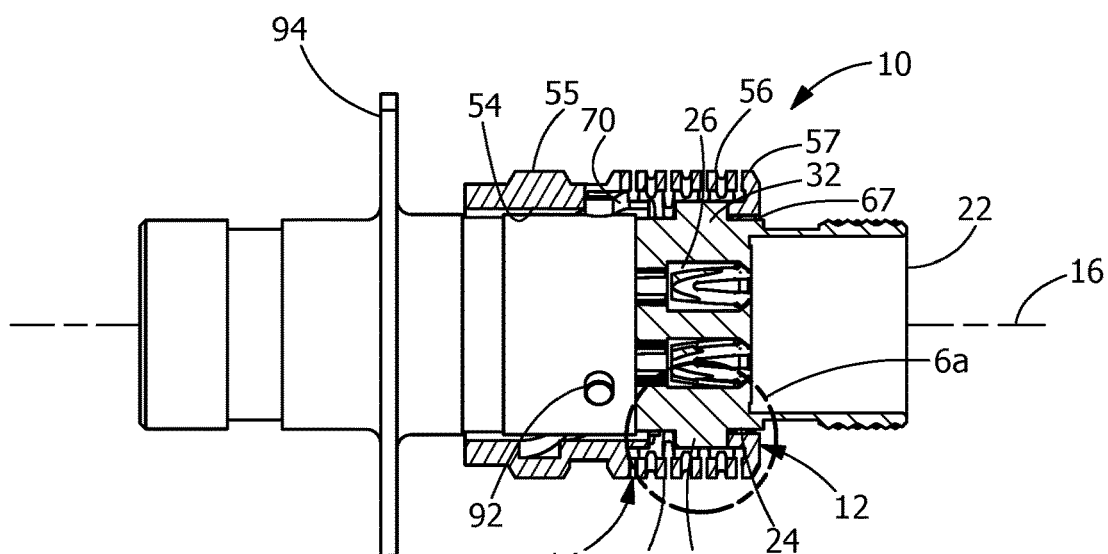
FIG. 6 is a cross-sectional view of the circular electrical connector of FIG. 1 in a fully inserted position on the mating connector.
Figure 6A:
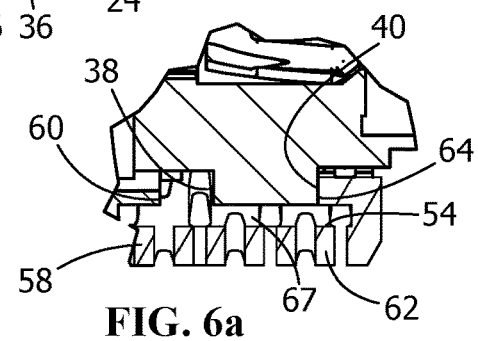
FIG. 6a is an enlarged view of the area designated by 6a of FIG. 6.
Figure 7:
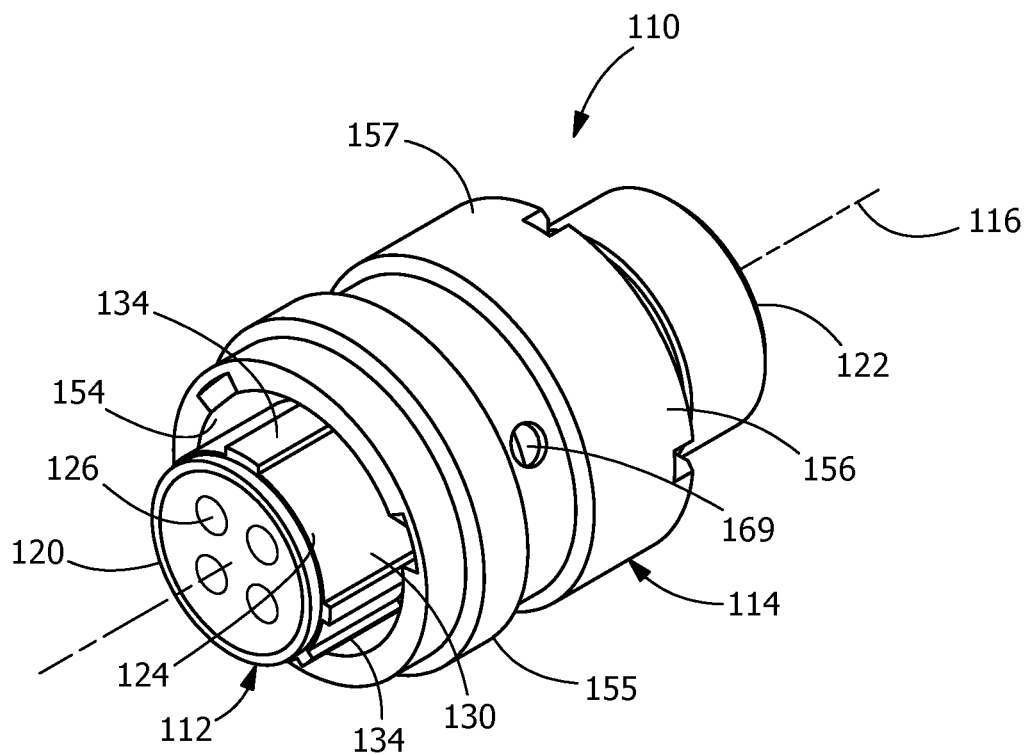
FIG. 7 is a front perspective of an illustrative embodiment of an alternate circular electrical connector of the present invention.
Figure 8:
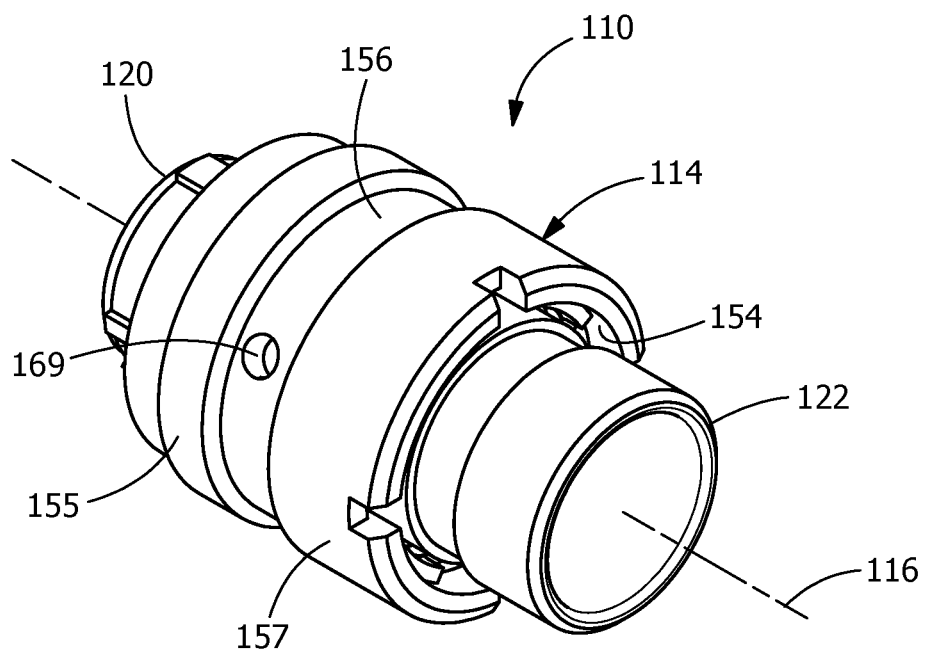
FIG. 8 is a back perspective view of the circular connector of FIG. 7.
Figure 9:
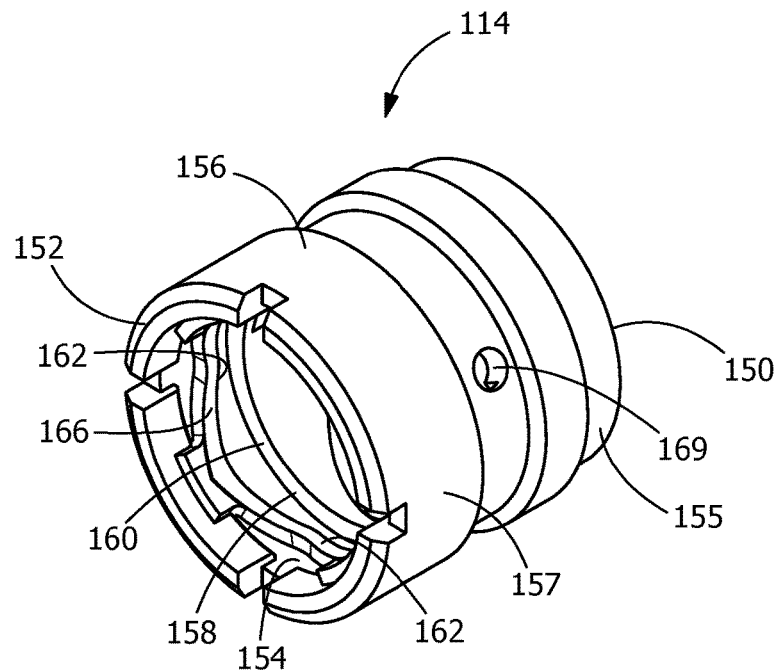
FIG. 9 is a perspective view of the coupling ring of FIG. 7.

Referring to FIGS. 4 through 6, the operation or mating of the circular electrical plug assembly 10 with the mating connector 80 is shown. In FIG. 4, the circular electrical plug assembly 10 is moved into engagement with the mating connector 80. As the mating connector 80 is mounted to a panel 94 or the like, the mating connector 80 is maintained in a stationary position. As the circular electrical plug assembly 10 is moved to the position shown in FIG. 5, the keying projections 34 of the shell 12 are moved into alignment with the guiding or keying recesses 90 of the mating connector 80. The cooperation of the keying projections 34 and the keying recesses 90 serve to properly mate the entire connector plug assembly 10 onto the mating connector 80. It is only when the keying projections 34 and the keying recesses 90 are in alignment that the mating connector 80 is able to be fully inserted into the mating connector receiving recess 74 of the connector plug assembly 10. With the keying projections 34 and the keying recesses 90 properly aligned, the camming projections 92 of the mating connector 80 are aligned with the ends of the helical annular grooves 68.

Once properly aligned, the electrical plug assembly 10 is moved toward the panel 94, causing the camming projections 92 to enter the helical annular grooves 68, as best shown in FIG. 4. With the camming projections 92 positioned in the helical annular grooves 68, the coupling ring 14 is rotated, causing the helical annular grooves 68 to rotate about the camming projections 92, as shown in FIG. 5. As this occurs, the force exerted by the camming projections 92 on the surfaces of the helical annular grooves 68 causes the mesh spring member 66 to expand and be placed in tension.

Rotation continues until the electrical plug assembly 10 is fully inserted onto the mating connector 80, as shown in FIG. 6. In this position, the camming projections 92 are positioned in the locking recesses 70 of the helical annular grooves 68. The camming projections 92 are maintained in the locking recesses 70 by the spring force applied by the mesh spring member 66, as the mesh spring member 66 attempts to move toward its unstressed position.

In order to remove the electrical plug assembly 10 from the mating connector 80, a sufficient rotational force must be applied to the coupling ring 14 to overcome the spring force applied the spring member 66.

With reference to the embodiment shown in FIGS. 7 through 12, a circular electrical connector plug assembly is shown generally at 110. The assembly of this invention comprises an electrical connector shell 112 and a coupling ring 114. The shell 112 and the coupling ring 114 are integrally molded in a 3D printing process or other additive manufacturing process. While the coupling ring 114 is rotatably mounted on the shell 112, the coupling ring 114 is not removable from the shell 112. The shell 112 and coupling ring 114 define a center longitudinal axis 116 for the connector assembly.

The shell 112 includes a mating face 120 and an oppositely facing conductor receiving face 122. A circular outer wall 124 extends between the mating face 120 and the conductor receiving face 122. Integrated contact receiving passages 126 extend through the shell 112 from the mating face 120 to the conductor receiving face 122. The contact receiving passages 126 are dimensioned to receive contacts (not shown) therein. The contacts may have varied configurations. The number and size of the contact receiving passages 126 may be varied without departing from the scope of the invention.

The outer wall 124 of the shell 112 includes a mating connector receiving portion 130 which extends circumferentially about the shell 112. The mating connector receiving portion 130 extends from the mating face 120 to a coupling ring receiving portion 132 of the outer wall 124. One or more guide or keying projections 134 project outward from the a mating connector receiving portion 130 of the outer wall 124. The keying projections 134 extend in a direction parallel to the longitudinal axis 116 of the shell 112. The size and positioning of the keying projections 134 may vary without departing from the scope of the invention.

A coupling ring retaining projection 136 extends from the coupling ring receiving portion 132 of the outer wall 124 circumferentially about the shell 112. In the illustrative embodiment shown, the coupling ring retaining projection 136 is positioned proximate to, but spaced from, the conductor receiving face 122. The coupling ring retaining projection 136 has a front shoulder 138 and a rear shoulder 140. The front shoulder 138 and the rear shoulder 140 extend in a direction which is essentially perpendicular to the longitudinal axis 116 of the shell 112.

The coupling ring 114 includes a mating face 150 and an oppositely facing rear face 152. A circular inner wall 154 and a circular outer wall 156 extends between the mating face 150 and the rear face 152. The diameter of the inner wall 154 of the coupling ring 114 is larger than the diameter of the outer wall 124 of the shell 112. The mating face 150 of the coupling ring 114 and the mating face 120 of the shell 112 are positioned in approximate alignment.

The coupling ring 114 has a mating connector receiving portion 155 and a shell receiving portion 157. A locking projection 158 extends from the inner wall 154 of the shell receiving portion 157 in a direction away from the outer wall 156. The locking projection 158 extends from the inner wall 154 circumferentially about the coupling ring 114. The locking projection 158 has a first shoulder 160 which extends in a direction which is essentially perpendicular to the longitudinal axis 116 of the shell 112.

One or more springs 166 are integrally positioned on and extend from the inner wall 154 of the shell receiving portion 157 in a direction away from the outer wall 156. The springs 166 have locking surfaces 162. In the illustrative embodiment shown, the locking surfaces 162 are positioned closer to the rear face 152 than the locking projection 158. Other configurations of the springs 166 may be used without departing from the scope of the invention.

When printed, the coupling ring 114 is spaced from the shell 112 by a gap 167. The size of the gap can be varied. As the coupling ring 114 and the shell 112 are formed in the same process, and as tooling cannot be inserted into the gap 167 to properly form the components, the coupling ring 114 and the shell 112 must be formed by an additive manufacturing process, such as, but not limited to 3D printing. Consequently, it is imperative that excess material or unwanted material be able to be cleaned out or removed from the coupling ring 114 and the shell 112 upon completion of the formation of the assembly 110. Providing a gap 167 between the coupling ring 114 and the shell 112 facilitates the cleaning or removal of the excess material.

Cleaning openings 169 are provided on the coupling ring 114. The cleaning openings 169 are positioned proximate to springs 166 and extend through the coupling ring 114 from the outer wall 156 to the inner wall 154. In this illustrative embodiment, three cleaning openings 169 are provided on the coupling ring 114. However, other numbers and positioning of the cleaning openings 169 may be used. The cleaning openings 169 facilitates the removal of the excess material or unwanted material from the coupling ring 114 and the shell 112 upon completion of the formation of the assembly 10. In particular, the photo curable resin used in manufacture must be completely rinsed from the assembly 110 in order to obtain optimal performance. The openings 169 prevent liquid material entrapment and allow adequate liquefied resin drainage and final rinsing/cleaning resulting in superior product performance.

Figure 10:
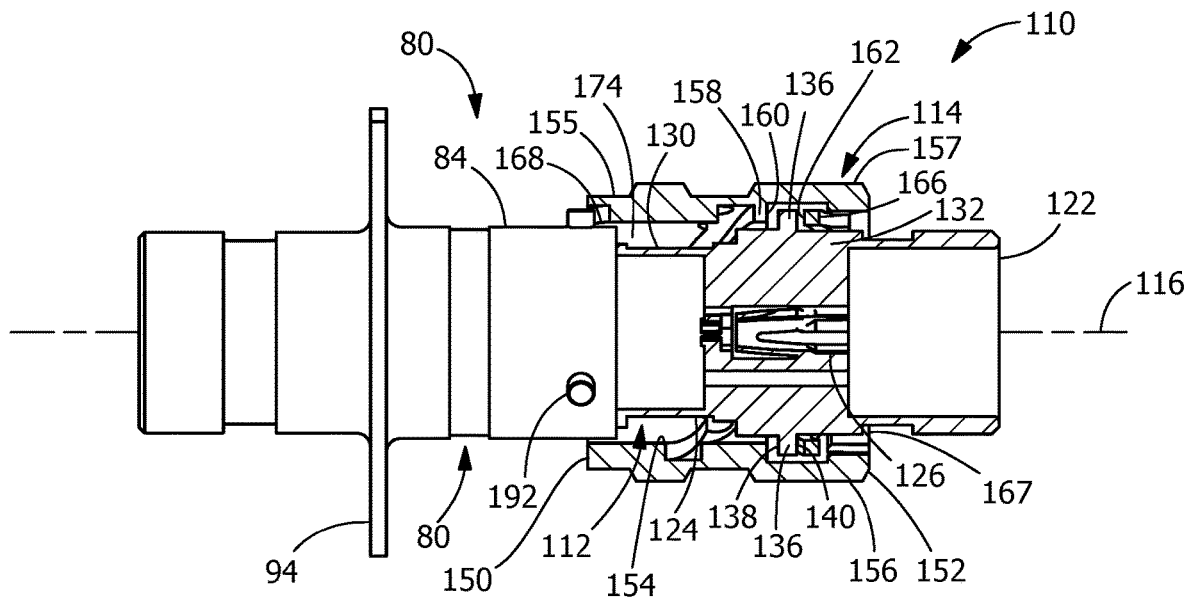
FIG. 10 is a cross-sectional view of the circular electrical connector of FIG. 7 in an initial position on the mating connector.

When in the initial or unstressed position, as shown in FIG. 10, the first shoulder 160 of the first locking projection 158 and the locking surfaces 162 of the springs 166 are able to move relative to the coupling ring retaining projection 136 of the coupling ring receiving portion 132 of the outer wall 124 circumferentially about the shell 112. In this position, the springs 166 are in an unstressed position, thereby allowing the limited movement between the coupling ring 114 and the shell 112. However, while the coupling ring 114 can move relative to the shell 112, the cooperation of the first shoulder 160 of the first locking projection 158 and the locking surfaces 162 of the springs 166 with the front shoulder 138 and the rear shoulder 140 of the coupling ring retaining projection 136 of the coupling ring receiving portion 132 of the outer wall 124 prevent the removal of the coupling ring 114 from the shell 112.

One or more helical annular grooves 168 are provided in the inner wall 154 of the mating connector receiving portion 155 of the coupling ring 114. The helical annular grooves 168 extend from the mating face 150 toward the rear face 152. The helical annular grooves 168 have locking recesses 170 provided proximate closed ends of the grooves 168.

A mating connector receiving recess 174 is provided between the outer wall 124 of the shell 112 and the inner wall 154 of the coupling ring 114. The mating connector receiving recess 174 extends from the mating face 120 to the coupling ring receiving portion 132 of the outer wall 124.

As best shown in FIG. 3, a mating connector 80 has a mating face 82 and a wall 84 which extends therefrom. The wall 84 defines a cavity 86 which is dimensioned to receive the shell 112 of the circular electrical plug assembly 110. An inner surface 88 of the wall 84 has guiding or keying recesses 90. The keying recesses 90 extend in a direction parallel to the longitudinal axis 116 of the shell 112. The size and positioning of the keying recesses 90 may vary without departing from the scope of the invention.

One or more camming projections 92 project from the wall 84 in a direction away from the cavity 86. The camming projections 92 are dimensioned and positioned on the wall to cooperate with the helical annular grooves 168 of the coupling ring 114.

Figure 11:
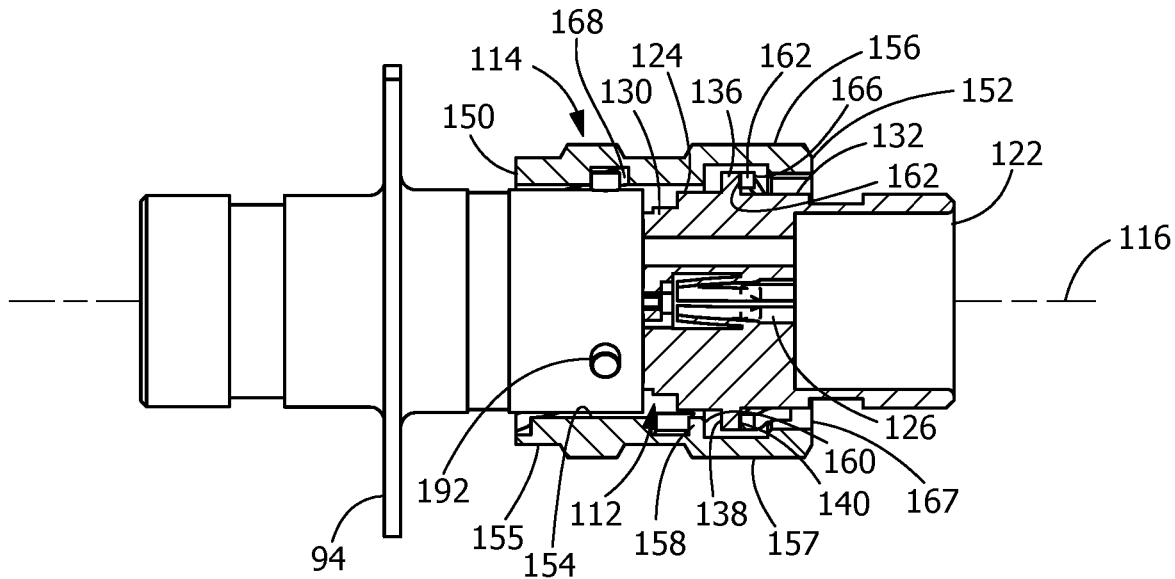
FIG. 11 is a cross-sectional view of the circular electrical connector of FIG. 7 in a partially inserted position on the mating connector.
Figure 12:
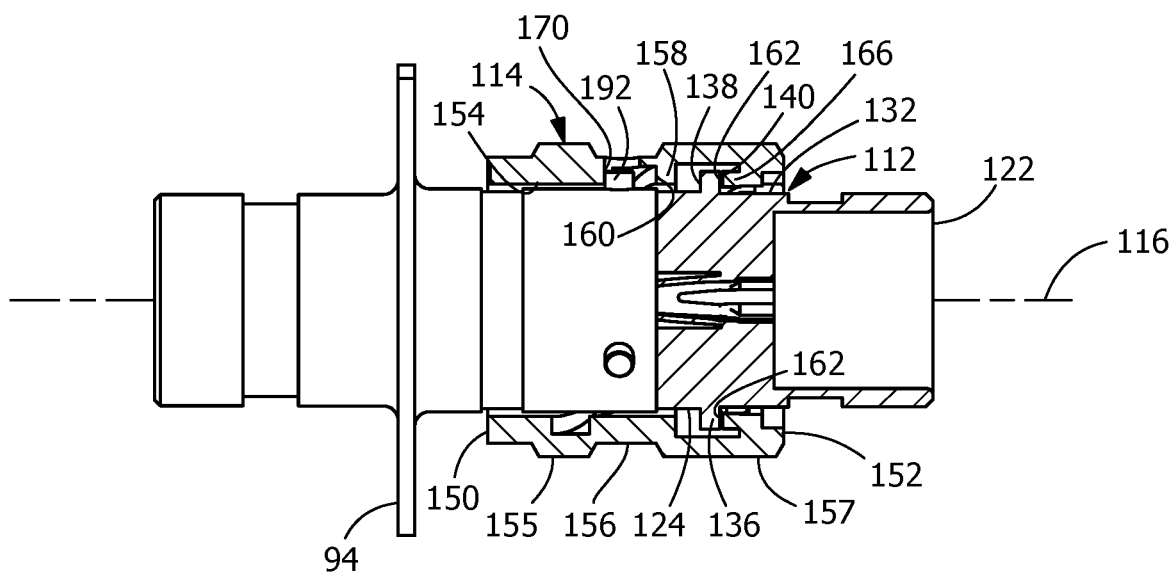
FIG. 12 is a cross-sectional view of the circular electrical connector of FIG. 7 in a fully inserted position on the mating connector.

Referring to FIGS. 10 through 12, the operation or mating of the circular electrical plug assembly 110 with the mating connector 80 is shown. In FIG. 10, the circular electrical plug assembly 110 is moved into engagement with the mating connector 80. As the mating connector 80 is mounted to a panel 94 or the like, the mating connector 80 is maintained in a stationary position. As the circular electrical plug assembly 110 is moved to the position shown in FIG. 11, the keying projections 134 of the shell 112 are moved into alignment with the guiding or keying recesses 90 of the mating connector 80. The cooperation of the keying projections 134 and the keying recesses 90 serve to properly mate the entire connector plug assembly 110 onto the mating connector 80. It is only when the keying projections 134 and the keying recesses 90 are in alignment that the mating connector 80 is able to be fully inserted into the mating connector receiving recess 174 of the connector plug assembly 110. With the keying projections 134 and the keying recesses 90 properly aligned, the camming projections 92 of the mating connector 80 are aligned with the ends of the helical annular grooves 168.

Once properly aligned, the electrical plug assembly 110 is moved toward the panel 194, causing the camming projections 192 to enter the helical annular grooves 168, as best shown in FIG. 10. With the camming projections 192 positioned in the helical annular grooves 168, the coupling ring 114 is rotated, causing the helical annular grooves 168 to rotate about the camming projections 192, as shown in FIG. 11. As this occurs, the force exerted by the camming projections 192 on the surfaces of the helical annular grooves 168 causes the coupling ring 114 to move, which in turn causes the springs 166 to flex and be placed in tension.

Rotation continues until the electrical plug assembly 110 is fully inserted onto the mating connector 80, as shown in FIG. 12. In this position, the camming projections 192 are positioned in the locking recesses 170 of the helical annular grooves 168. The camming projections 92 are maintained in the locking recesses 170 by the spring force applied by the springs 166, as the springs 66 attempts to return toward their unstressed position.

In order to remove the electrical plug assembly 110 from the mating connector 80, a sufficient rotational force must be applied to the coupling ring 114 to overcome the spring force applied the springs 166.

As described above, the method of manufacturing an electrical connector with an integral coupling ring includes: printing a body of the circular electrical connection in an additive manufacturing process; printing the integral coupling ring simultaneously with the printing of the body, the integral coupling ring being spaced from the body to allow the integral coupling ring to rotate relative to the body; and removing residual residue produced during the printing and cleaning of the body and the integral coupling ring through openings formed during the printing of the body and the integral coupling ring.

The integrally molded electrical plug assembly of the present invention, with the captured coupling ring and the integrated spring member, can be quickly molded with a significant reduction in cost through the elimination of various loose pieces and the assembly processes associated therewith. The integration of the spring member in the coupling ring eliminates the need for front and rear inserts, retention clips, and the traditional bonding process and respective adhesives. The configuration of the integrally molded electrical plug assembly allows for proper cleaning of the residual resin associated with additive manufacturing processes.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical connector comprising:
   a shell having integrated contact receiving passages, the shell having an outer wall with a coupling ring retaining projection;
   a coupling ring integrally mounted on the shell, the coupling ring being movable between a first position and a second position, the coupling ring has a mating connector receiving portion and a shell receiving portion;
   a first locking projection extends from an inner wall of the shell receiving portion in a direction away from an outer wall of the shell receiving portion;
   a second locking projection extends from the inner wall of the shell receiving portion in a direction away from the outer wall; and
   a spring integrally positioned on the coupling ring, the spring being provided in a stressed position when the coupling ring is moved to the second position.

2. The electrical connector as recited in claim 1, wherein openings are provided in the coupling ring, the openings being positioned proximate to the spring, the openings are dimensioned to allow the removal of residual material produced during the manufacture of the electrical connector.

3. The electrical connector as recited in claim 1, wherein the coupling ring retaining projection extends circumferentially about the shell.

4. The electrical connector as recited in claim 1, wherein the coupling ring retaining projection has a front shoulder and a rear shoulder, the front shoulder and the rear shoulder extend in a direction which is essentially perpendicular to a longitudinal axis of the shell.

5. The electrical connector as recited in claim 1, wherein the second locking projection extends from the inner wall circumferentially about the coupling ring, the second locking projection has a second shoulder which extends in a direction which is essentially perpendicular to the longitudinal axis of the shell.

6. The electrical connector as recited in claim 5, wherein the spring is a mesh spring integrally formed in the shell receiving portion, the mesh spring extends between the first locking projection and the second locking projection, the mesh spring allows the movement of the second locking projection and the mating connector receiving portion to move relative to the first locking projection.

7. The electrical connector as recited in claim 5, wherein a gap is provided between the shell and the coupling ring, wherein as the coupling ring and the shell are formed in the same process, the gap between the coupling ring and the shell facilitates the cleaning or removal of the excess material.

8. The electrical connector as recited in claim 1, wherein the first locking projection extends from the inner wall circumferentially about the coupling ring, the first locking projection has a first shoulder which extends in a direction which is essentially perpendicular to the longitudinal axis of the shell.

9. The electrical connector as recited in claim 8, wherein the spring extends from the inner wall of the shell receiving portion in a direction away from the outer wall, the spring has locking surface.

10. An electrical connector made from an additive manufacturing process, the electrical connector comprising:
    a shell having contact receiving passages, the shell having an outer wall with a coupling ring retaining projection;
    a coupling ring integrally mounted on the shell, the coupling ring is not removable from the shell, the coupling ring being movable between a first position and a second position;
    a first locking projection extends from an inner wall of the coupling ring in a direction away from an outer wall of the coupling ring;
    a spring integrally positioned on the coupling ring, the spring being provided in a stressed position when the coupling ring is moved to the second position, the spring having a locking surface provide thereon;
    openings provided in the coupling ring, the openings being positioned proximate the spring, the openings are configured to allow the removal of residual material produced during the additive manufacturing process; and
    a gap provided between the shell and the coupling ring, wherein as the coupling ring and the shell are formed in the same additive manufacturing process, the gap between the coupling ring and the shell facilitates the cleaning or removal of the excess material and allows the coupling ring to rotate about the shell.

11. The electrical connector as recited in claim 10, wherein the coupling ring retaining projection has a front shoulder and a rear shoulder, the front shoulder and the rear shoulder extend in a direction which is essentially perpendicular to a longitudinal axis of the shell.

12. The electrical connector as recited in claim 11, wherein the first locking projections extends from the inner wall circumferentially about the coupling ring, the first locking projection has a first shoulder which extends in a direction which is essentially perpendicular to the longitudinal axis of the shell.

13. The electrical connector as recited in claim 12, wherein a second locking projection extends from the inner wall of the coupling ring in a direction away from the outer wall, the second locking projection extends from the inner wall circumferentially about the coupling ring, the second locking projection has a second shoulder which extends in a direction which is essentially perpendicular to the longitudinal axis of the shell.

14. The electrical connector as recited in claim 13, wherein the spring is a mesh spring integrally formed in the shell receiving portion, the mesh spring extends between the first locking projection and the second locking projection, the mesh spring allows the movement of the second locking projection and the mating connector receiving portion to move relative to the first locking projection.

15. The electrical connector as recited in claim 14, wherein the spring extends from the inner wall of the coupling ring in a direction away from the outer wall, the spring has locking surface.

* * * * *